(12) United States Patent
Tang

(10) Patent No.: US 11,317,453 B2
(45) Date of Patent: Apr. 26, 2022

(54) DEVICE TO DEVICE COMMUNICATION METHOD FOR REDUCING MUTUAL INTERFERENCE BETWEEN DIFFERENT TYPES OF TERMINAL DEVICES, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 191 days.

(21) Appl. No.: 16/708,798

(22) Filed: Dec. 10, 2019

(65) Prior Publication Data

US 2020/0120729 A1 Apr. 16, 2020

Related U.S. Application Data

(63) Continuation of application No. PCT/CN2017/095650, filed on Aug. 2, 2017.

(51) Int. Cl.
*H04W 76/14* (2018.01)
*H04L 5/00* (2006.01)
(Continued)

(52) U.S. Cl.
CPC ........... *H04W 76/14* (2018.02); *H04L 5/0005* (2013.01); *H04L 5/0094* (2013.01); *H04W 8/005* (2013.01); *H04W 72/1263* (2013.01); *H04W 4/40* (2018.02)

(58) Field of Classification Search
CPC . H04W 76/14; H04W 8/005; H04W 72/1263; H04W 4/40; H04W 28/0205;
(Continued)

(56) References Cited

U.S. PATENT DOCUMENTS 9,693,338 B2 6/2017 Zhao et al.
2016/0135239 A1* 5/2016 Khoryaev ......... H04W 72/1289
370/329
(Continued)

FOREIGN PATENT DOCUMENTS

CN 108696935 A 10/2016
CN 106165524 A 11/2016
(Continued)

OTHER PUBLICATIONS

English Machine Translation (CN 2016/10959023.4) (Year: 2018).*
(Continued)

*Primary Examiner* — Ian N Moore
*Assistant Examiner* — Rushil Parimal Sampat

(57) ABSTRACT

The present disclosure discloses a method for D2D communication, a terminal device and a network device, where the method includes: determining, by a terminal device, a resource pool for data transmission from a plurality of resource pools according to a transmission mode used by the terminal device and whether the terminal device has a sensing capability, where different resource pools in the plurality of resource pools are used for data transmission by different types of terminal devices, and at least one of the following information of the different types of terminal devices is different: a transmission mode in use, a supported version of a communication protocol, and whether or not there is the sensing capability; performing, by the terminal device, data transmission using a time-frequency resource in the resource pool. Therefore, different types of terminal
(Continued)

devices can transmit data together in a communication system and mutual interference is reduced.

10 Claims, 5 Drawing Sheets

(51) Int. Cl.
H04W 8/00 (2009.01)
H04W 72/12 (2009.01)
H04W 4/40 (2018.01)

(58) Field of Classification Search
CPC ..... H04W 24/02; H04W 28/02; H04W 72/02; H04W 72/044; H04W 92/18; H04L 5/0005; H04L 5/0094
See application file for complete search history.

(56) References Cited

U.S. PATENT DOCUMENTS

| | | | |
|---|---|---|---|
| 2016/0295624 A1 | 10/2016 | Novlan et al. | |
| 2016/0302215 A1* | 10/2016 | Sorrentino | H04W 76/14 |
| 2017/0041902 A1 | 2/2017 | Sheng | |
| 2020/0059896 A1* | 2/2020 | Xu | H04W 72/02 |
| 2020/0059936 A1* | 2/2020 | Li | H04W 72/044 |

FOREIGN PATENT DOCUMENTS

| | | | |
|---|---|---|---|
| CN | 106256157 A | 12/2016 | |
| CN | 106416405 A | 2/2017 | |
| CN | 106537836 A | 3/2017 | |
| CN | 106793090 A | 5/2017 | |
| CN | 108633048 A | 10/2018 | |
| WO | 2015142113 A1 | 9/2015 | |
| WO | WO 2018/201414 A1 * | 11/2018 | |

OTHER PUBLICATIONS

The second Office Action of corresponding Chinese application No. 201780091711.6, dated Aug. 14, 2020.
OPPO. Discussion on the mode-2 resource allocation for V2V3GPP TSG RAN WG1 Meeting #84 bis,R1-162336; Apr. 11, 2016-Apr. 15, 2016.
The first Office Action of corresponding Indian application No. 201917053923, dated May 11, 2021.
The EESR of corresponding European application No. 17920355.9, dated Mar. 25, 2020.
The First Office Action of corresponding Chinese application No. 201780091711.6, dated Jun. 1, 2020.
Intel Corporation:"Sharing resource pool for eNB-controlled and UE-autonomous V2V transmission modes", 3GPP Draft; R1-1707303 Intel- V2X_TMMUX, 3rd Generation Partnership Project (3GPP), Mobile Competence Centre; 650, Route Des Lucioles; F-06921 Sophia-Antipolis Cedex; France, vol. RAN WG1, no. Hangzhou; May 15, 2017-May 19, 2017 May 14, 2017(May 14, 2017), XP051272516.
NTT DOCOMO et al:"Resource pool sharing between UEs using mode 3 and UEs using Mode 4", 3GPP Draft: R1-1708427 Resource Pool Sharing Between UEs Using Mode 3 and Uesusing Mode 4, 3rd Generation Partnership Project (3GPP), Mobile Competence Centre; 650, Route Des Lucioles; F-06921 Sophi, vol. RAN WG1, no. Hangzhou, China: May 15, 2017-May 19, 2017 May 5, 2017(May 5, 2017), XP051261424.
ZTE: "Considerations far shared resource pool between mode 3 and mode 4", 3GPP Draft; R1-1707213-6.2.3.1.3 Considerations for Shared Resource Pool, 3rd Generation Partnership Project (3GPP), Mobile Competence Centre; 650, Route Des Lucioles; F-06921 Sophia-Antipolis Cedex; France, vol. RAN WG1, no. Hangzhou, 2017-May 19, 2017 May 6, 2017(May 6, 2017), XP051261717.
Samsung:"Resource pool sharing between mode 3 and mode 4 UEs", 3GPP Draft; R1-1707908 Mode 3 and Mode 4, 3rd Generation Partnership Project (3GPP), Mobile Competence Centre; 650, Route Des Lucioles; F-06921 Sophia-Antipolis Cedex; France, vol. RAN WG1, no. Hangzhou, China; May 15, 2017-May 19, 2017 May 6, 2017(May 6, 2017), XP051262128.
Ericsson, 3GPP TSG-RAN WG2 #97 Tdoc R2-1700944, Discussion on Sidelink Operations for Pedestrian, published on Feb. 17, 2017.
CATT, 3GPP TSG RAN WG1 Meeting #89 R1-1707450, Discussion on resource pool sharing between mode 3 and mode 4, published on May 19, 2017.
Ericsson, 3GPP TSG-RAN WG2 #95bis Tdoc R2-16696, Discussion on Sidelink Operations for Pedestrian, published on Oct. 14, 2016.

* cited by examiner

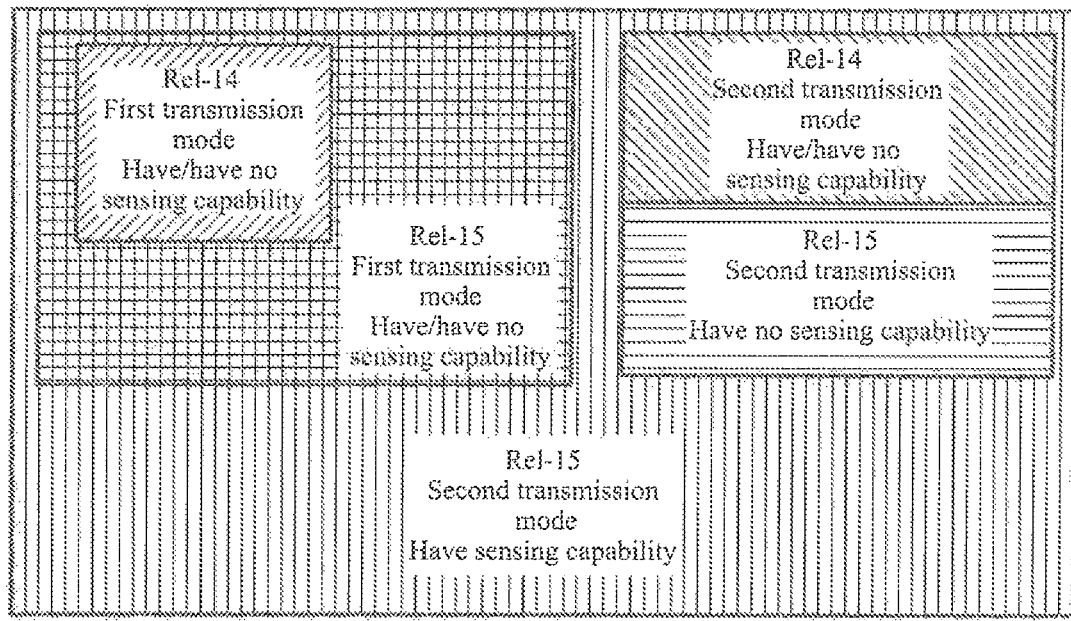

FIG. 5

A network device determines a plurality of resource pools, where different resource pools in the plurality of resource pools are used for data transmission by different types of terminal devices, respectively, and at least one of the following information of the different types of terminal devices is different: a transmission mode in use, a supported version of a communication protocol, and whether or not there is a sensing capability ~ 610

The network device transmits indication information to the terminal device, where the indication information is used for indicating the plurality of resource pools ~ 620

FIG. 6

DEVICE TO DEVICE COMMUNICATION METHOD FOR REDUCING MUTUAL INTERFERENCE BETWEEN DIFFERENT TYPES OF TERMINAL DEVICES, TERMINAL DEVICE AND NETWORK DEVICE

CROSS-REFERENCE TO RELATED APPLICATIONS

This application is a continuation of International Application No. PCT/CN2017/095650, filed on Aug. 2, 2017, the content of which is incorporated herein by reference in its entirety.

TECHNICAL FIELD

Embodiments of the present disclosure relate to the field of wireless communications and, in particular, to a method for device to device (D2D) communication, a terminal device, and a network device.

BACKGROUND

Internet of Vehicles that may also be called Vehicle to Everything (V2X) communication system is a sidelink (SL) transmission technology based on D2D communication. Different from the traditional way of receiving or transmitting data through a base station in a Long Term Evolution (LTE) system, the Internet of Vehicles system adopts a manner of terminal to terminal direct communication, thus having higher spectrum efficiency and lower transmission delay. In the version of Release-14 of the 3rd Generation Partnership Project (3GPP) protocol, two transmission modes (mode 3 and mode 4) are defined for the Internet of Vehicles. A terminal device using the transmission mode 3 and a terminal device using the transmission mode 4 transmit data in different resource pools. A resource used by the terminal using the mode 3 is allocated by a base station, and the terminal transmits data on the sidelink according to the resource allocated by the base station; while the terminal using the mode 4 can independently select a transmission resource of the sidelink, for example, the terminal can randomly select a resource on the sidelink or can determine a resource by sensing.

Since the terminal device using the transmission mode 3 is connected with the base station, and its transmission resource is allocated by the base station, when the terminal device using the transmission mode 3 and the terminal device using the transmission mode 4 coexist, it is more necessary to protect the transmission reliability of the terminal device using the transmission mode 3.

For a terminal that supports the new version of Release-15 of the 3GPP protocol, these two transmission modes can also be used. Moreover, the terminal device under each of the two versions may be a terminal device having a sensing capability, or may be a terminal device having no sensing capability. In this way, since the terminal device having no sensing capability cannot know the resource usage of other terminal devices, it is likely to interfere with the data transmission of the terminal device using the transmission mode 3.

Therefore, how to enable different types of terminal devices to transmit data together in a communication system and reduce mutual interference is an urgent problem to be solved.

SUMMARY

Embodiments of the present disclosure provide a method for D2D communication, a terminal device and a network device, which enable different types of terminal devices to transmit data together in a communication system and reduce mutual interference.

In a first aspect, a method for D2D communication is provided, including: determining, by a terminal device, a resource pool for data transmission from a plurality of resource pools, according to a transmission mode used by the terminal device and whether the terminal device has a sensing capability, where different resource pools in the plurality of resource pools are used for data transmission by different types of terminal devices, respectively, and at least one of the following information of the different types of terminal devices is different: a transmission mode in use, a supported version of a communication protocol, and whether or not there is the sensing capability; and performing, by the terminal device, data transmission using a time-frequency resource in the resource pool.

Therefore, using the embodiment of the present disclosure, different resource pools are obtained for different types of terminal devices by dividing, and the relationships between the resource pools are coordinated reasonably, so that the different types of terminal devices transmit data together in a communication system and mutual interference is reduced, which in particular ensures the transmission reliability of a terminal device that transmits data using a first transmission mode, and simultaneously enables a terminal device that supports a new version to have a larger resource pool range, improving the resource utilization. At least one of the following information of the different types of terminal devices is different: a supported version of a protocol, a transmission mode in use, and whether or not there is the sensing capability.

In a possible implementation, if the terminal device supports a communication protocol of a version of Release-14 and does not support a communication protocol of a version of Release-15, the determining, by a terminal device, a resource pool for data transmission by the terminal device includes: determining, by the terminal device, that the resource pool is a first resource pool if the terminal device uses a second transmission mode and does not have the sensing capability; determining, by the terminal device, that the resource pool is a second resource pool if the terminal device uses the second transmission mode and has the sensing capability, where the second resource pool does not overlap the first resource pool; and determining, by the terminal device, that the resource pool is a third resource pool if the terminal device uses a first transmission mode, where the third resource pool does not overlap the first resource pool, and the third resource pool does not overlap the second resource pool.

In a possible implementation, the first resource pool includes a first sub-resource pool and a second sub-resource pool, the determining, by the terminal device, that the resource pool is a first resource pool includes: determining, by the terminal device, that the resource pool is the first sub-resource pool in the first resource pool if the terminal device uses the second transmission mode and does not have the sensing capability.

In a possible implementation, if the terminal device supports the communication protocol of the version of Release-15, the terminal device determining the resource pool for data transmission by the terminal device includes: determining, by the terminal device, that the resource pool is the first resource pool if the terminal device uses the second transmission mode and does not have the sensing capability; and determining, by the terminal device, that the resource pool is a fourth resource pool if the terminal device uses the first transmission mode or if the terminal device uses the second transmission mode and has the sensing capability, where the fourth resource pool does not overlap the first resource pool.

In a possible implementation, the determining, by the terminal device, that the resource pool is the first resource pool includes: determining, by the terminal device, that the resource pool is the second sub-resource pool in the first resource pool if the terminal device uses the second transmission mode and does not have the sensing capability.

In a possible implementation, the fourth resource pool includes the second resource pool and/or the third resource pool.

In a possible implementation, the second resource pool includes the fourth resource pool.

In a possible implementation, the third resource pool includes the fourth resource pool.

In a possible implementation, if the terminal device supports a communication protocol of a version of Release-14 and does not support a communication protocol of a version of Release-15, the determining, by a terminal device, a resource pool for data transmission by the terminal device includes: determining, by the terminal device, that the resource pool is a fifth resource pool if the terminal device uses a second transmission mode; and determining, by the terminal device, that the resource pool is a sixth resource pool if the terminal device uses a first transmission mode, where the sixth resource pool does not overlap the fifth resource pool.

In a possible implementation, the fifth resource pool includes a third sub-resource pool and a fourth sub-resource pool, the determining, by the terminal device, that the resource pool is a fifth resource pool includes: determining, by the terminal device, that the resource pool is the third sub-resource pool in the fifth resource pool if the terminal device uses the second transmission mode.

In a possible implementation, if the terminal device supports the communication protocol of the version of Release-15, the determining, by the terminal device, a resource pool for data transmission by the terminal device includes: determining, by the terminal device, that the resource pool is the fifth resource pool if the terminal device uses the second transmission mode and does not have the sensing capability; determining, by the terminal device, that the resource pool is a seventh resource pool if the terminal device uses the first transmission mode, where the seventh resource pool does not overlap the fifth resource pool; and determining, by the terminal device, that the resource pool is an eighth resource pool if the terminal device uses the second transmission mode and has the sensing capability.

In a possible implementation, the determining, by the terminal device, that the resource pool is the fifth resource pool includes: determining, by the terminal device, that the resource pool is the fourth sub-resource pool in the fifth resource pool if the terminal device uses the second transmission mode and does not have the sensing capability.

In a possible implementation, the seventh resource pool includes the sixth resource pool.

In a possible implementation, the sixth resource pool includes the seventh resource pool.

In a possible implementation, the eighth resource pool includes at least one of the following resource pools: the fifth resource pool, the sixth resource pool and the seventh resource pool.

In a possible implementation, the fifth resource pool includes the eighth resource pool.

In a possible implementation, the sixth resource pool includes the eighth resource pool.

In a possible implementation, the seventh resource pool includes the eighth resource pool.

In a possible implementation, the time-frequency resource used for the data transmission by the terminal device is a resource scheduled by a network device when the terminal device uses the first transmission mode; and the time-frequency resource is a resource independently selected by the terminal device in a corresponding resource pool when the terminal device uses the second transmission mode.

The first transmission mode may be, for example, the foregoing transmission mode 3, and when the terminal device uses the first transmission mode, the time-frequency resource for the data transmission by the terminal device is a resource scheduled by the network device; and the second transmission mode may be, for example, the foregoing transmission mode 4, and when the terminal device uses the second transmission mode, the time-frequency resource is a resource independently selected by the terminal device in a corresponding resource pool, for example, the terminal device randomly selects the resource in the corresponding resource pool and/or selects the resource based on a result of resource sensing.

In a second aspect, a method for D2D communication is provided, including: determining, by a network device, a plurality of resource pools, where different resource pools in the plurality of resource pools are used for data transmission by different types of terminal devices, respectively, and at least one of the following information of the different types of terminal devices is different: a transmission mode in use, a supported version of a communication protocol, and whether or not there is a sensing capability; and transmitting, by the network device, indication information to a terminal device, where the indication information is used for indicating the plurality of resource pools.

Therefore, the network device obtains different resource pools for different types of terminal devices by dividing and reasonably coordinates the relationships between the resource pools, so that the different types of terminal devices transmit data together in a communication system and mutual interference is reduced, which in particular ensures the transmission reliability of the terminal device that transmits data using a first transmission mode, and simultaneously enables the terminal device that supports a new version to have a larger resource pool range, improving the resource utilization. At least one of the following information of the different types of terminal devices is different: a supported version of a protocol, a transmission mode in use, and whether or not there is the sensing capability.

In a possible implementation, the plurality of resource pools include a first resource pool, a second resource pool, a third resource pool and a fourth resource pool, where the first resource pool, the second resource pool and the third resource pool do not overlap each other, and the fourth resource pool does not overlap the first resource pool, where the first resource pool is used for data transmission by a terminal device of the following type: a terminal device that uses a second transmission mode and does not have the sensing capability; the second resource pool is used for data transmission by a terminal device of the following type: a terminal device that supports a version of Release-14, does not support a version of Release-15, uses the second transmission mode and has the sensing capability; the third resource pool is used for data transmission by a terminal device of the following type: a terminal device that supports the version of Release-14, does not support the version of Release-15 and uses a first transmission mode; and the fourth resource pool is used for data transmission by a terminal device of the following type: a terminal device that supports the version of Release-15 and uses the first transmission mode, or a terminal device that supports the version of Release-15, uses the second transmission mode and has the sensing capability.

In a possible implementation, the fourth resource pool includes the second resource pool and/or the third resource pool.

In a possible implementation, the second resource pool includes the fourth resource pool.

In a possible implementation, the third resource pool includes the fourth resource pool.

In a possible implementation, the first resource pool comprises a first sub-resource pool and a second sub-resource pool, where the first sub-resource pool is specifically used for data transmission by a terminal device that supports the version of Release-14, does not support the version of Release-15, uses the second transmission mode and does not have the sensing capability; and the second sub-resource pool is specifically used for data transmission by a terminal device that supports the version of Release-15, uses the second transmission mode and does not have the sensing capability.

In a possible implementation, the plurality of resource pools include a fifth resource pool, a sixth resource pool, a seventh resource pool and an eighth resource pool, where the fifth resource pool does not overlap the sixth resource pool, and the fifth resource pool does not overlap the seventh resource pool; where the fifth resource pool is used for data transmission by terminal devices of the following types: a terminal device that supports a version of Release-14, does not support a version of Release-15 and uses a second transmission mode, and a terminal device that supports the version of Release-15, uses the second transmission mode and does not have the sensing capability; the sixth resource pool is used for data transmission by a terminal device of the following type: a terminal device that supports the version of Release-14, does not support the version of Release-15 and uses a first transmission mode; the seventh resource pool is used for data transmission by a terminal device of the following type: a terminal device that supports the version of Release-15 and uses the first transmission mode; and the eighth resource pool is used for data transmission by a terminal device of the following type: a terminal device that supports the version of Release-15, uses the second transmission mode and has the sensing capability.

In a possible implementation, the seventh resource pool includes the sixth resource pool.

In a possible implementation, the sixth resource pool includes the seventh resource pool.

In a possible implementation, the eighth resource pool includes at least one of the following resource pools: the fifth resource pool, the sixth resource pool and the seventh resource pool.

In a possible implementation, the fifth resource pool includes the eighth resource pool.

In a possible implementation, the sixth resource pool includes the eighth resource pool.

In a possible implementation, the seventh resource pool includes the eighth resource pool.

In a possible implementation, the fifth resource pool includes a third sub-resource pool and a fourth sub-resource pool, where the third sub-resource pool is specifically used for data transmission by a terminal device that supports the version of Release-14, does not support the version of Release-15 and uses the second transmission mode, and the fourth sub-resource pool is specifically used for data transmission by a terminal device that supports the version of Release-15, uses the second transmission mode and does not have the sensing capability.

In a possible implementation, a time-frequency resource for the data transmission by the terminal device is a resource scheduled by the network device when the terminal device uses the first transmission mode; and the time-frequency resource is a resource independently selected by the terminal device in a corresponding resource pool when the terminal device uses the second transmission mode.

In a third aspect, a terminal device is provided, and the terminal device can perform operations of the terminal device in the above first aspect or any optional implementation of the first aspect. Specifically, the terminal device can include modular units that are configured to perform the operations of the terminal device in the above first aspect or any possible implementation of the first aspect.

In a fourth aspect, a network device is provided, and the network device can perform the operations of the network device in the above second aspect or any optional implementation of the second aspect. Specifically, the network device can include modular units that are configured to perform the operations of the network device in the second aspect or any possible implementation of the second aspect.

In a fifth aspect, a terminal device is provided, and the terminal device includes: a processor, a transceiver and a memory. The processor, the transceiver and the memory communicate with each other through internal connection paths. The memory is configured to store instructions, and the processor is configured to execute the instructions stored by the memory. When the processor executes the instructions stored by the memory, the execution causes the terminal device to perform the method of the first aspect or any possible implementation of the first aspect, or causes the terminal device to implement the terminal device provided by the third aspect.

In a sixth aspect, a network device is provided, and the network device includes: a processor, a transceiver and a memory. The processor, the transceiver and the memory communicate with each other through internal connection paths. The memory is configured to store instructions, and the processor is configured to execute the instructions stored by the memory. When the processor executes the instructions stored by the memory, the execution causes the network device to perform the method of the second aspect or any possible implementation of the second aspect, or causes the network device to implement the network device provided by the fourth aspect.

In a seventh aspect, a computer readable storage medium is provided, and the computer readable storage medium has a program stored thereon which causes a terminal device to perform the method for D2D communication in the above first aspect or any one of the various implementations thereof.

In an eighth aspect, a computer readable storage medium is provided, and the computer readable storage medium has a program stored thereon which causes a network device to perform the method for D2D communication in the above second aspect or any one of the various implementations thereof.

In a ninth aspect, a system chip is provided, and the system chip includes an input interface, an output interface, a processor and a memory; where the processor is configured to execute instructions stored by the memory, and when the instructions are executed, the processor can implement the method in the first aspect or any possible implementation of the first aspect.

In a tenth aspect, a system chip is provided, and the system chip includes an input interface, an output interface, a processor and a memory; where the processor is configured to execute instructions stored by the memory, and when the instructions are executed, the processor can implement the method in the second aspect or any possible implementation of the second aspect.

In an eleventh aspect, a computer program product including instructions is provided, and when running on a computer, the computer program product causes the computer to perform the method in the first aspect or any possible implementation of the first aspect.

According to a twelfth aspect, a computer program product including instructions is provided, and when running on a computer, the computer program product causes the computer to perform the method in the second aspect or any possible implementation of the second aspect.

BRIEF DESCRIPTION OF THE DRAWINGS

FIG. 5 is a schematic diagram of resource pool division according to an embodiment of the present disclosure.

FIG. 6 is a schematic flowchart of a method for D2D communication according to an embodiment of the present disclosure.

DESCRIPTION OF EMBODIMENTS

The technical solutions in embodiments of the present disclosure will be described below with reference to the accompanying drawings.

It should be understood that the technical solutions of the embodiments of the present disclosure can be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, an LTE Frequency Division Duplex (FDD) system, an LTE Time Division Duplex (TDD) system, a Universal Mobile Telecommunication System (UMTS), and a future 5G communication system.

The present disclosure describes various embodiments in connection with a terminal device. The terminal device may also refer to a user equipment (UE), an access terminal, a subscriber unit, a subscriber station, a mobile station, a mobile radio station, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device or a computing device with wireless communication function, or other processing device, in-vehicle device, wearable device connected to a wireless modem, a terminal device in a future 5G network, or a terminal device in a future evolved Public Land Mobile Network (PLMN) network, etc.

The present disclosure describes various embodiments in connection with a network device. The network device may be a device for communicating with the terminal device, for example, it may be a Base Transceiver Station (BTS) in a GSM system or CDMA, or may be a NodeB (NB) in a WCDMA system, or may be an Evolutional Node B (eNB or eNodeB) in an LTE system, or the network device may be a relay station, an access point, an in-vehicle device, a wearable device, or a network side device in a future 5G network or a network side device in a future evolved PLMN network, etc.

Figure 1:
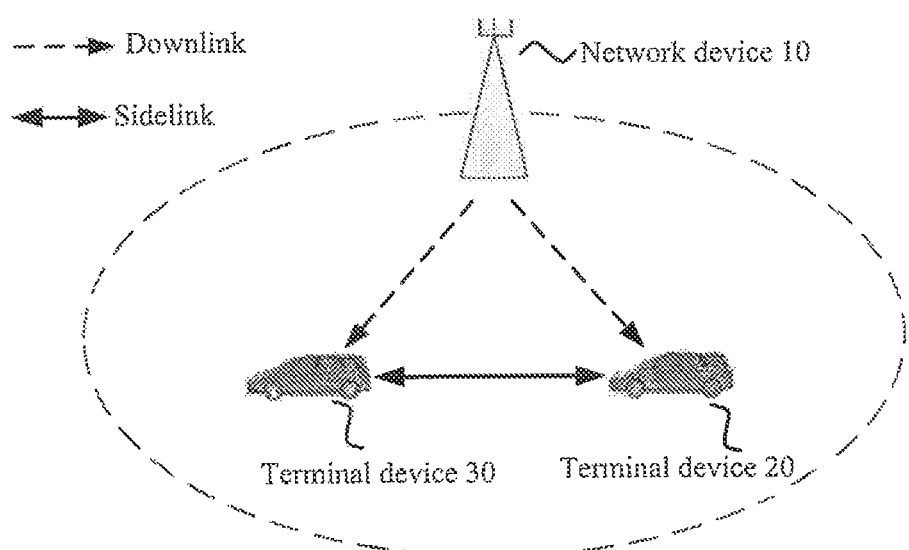
FIG. 1 is a schematic architecture diagram of an application scenario of embodiments of the present disclosure.
Figure 2:
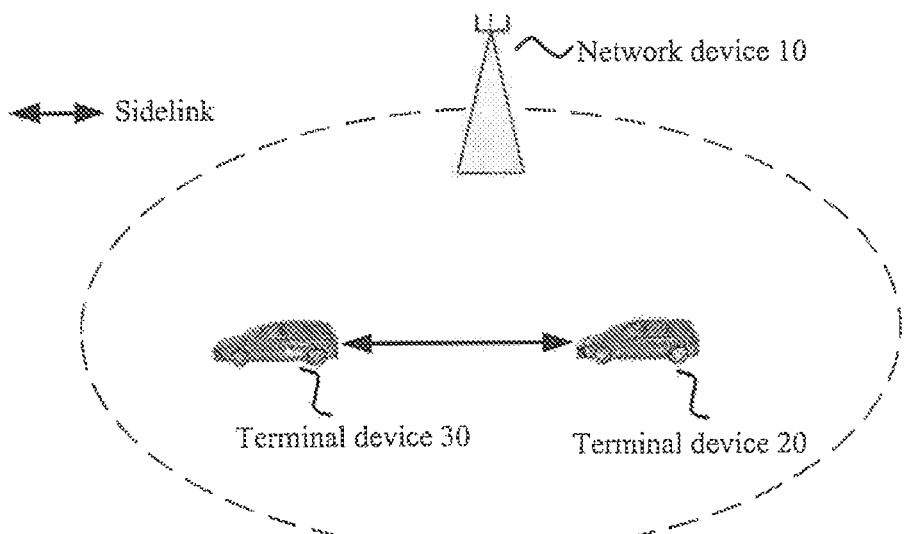
FIG. 2 is a schematic architecture diagram of another application scenario of embodiments of the present disclosure.

FIG. 1 and FIG. 2 are schematic diagrams of an application scenario of embodiments of the present disclosure. FIG. 1 exemplarily shows one network device and two terminal devices. In an embodiment, the wireless communication system may include a plurality of network devices and other numbers of terminal devices may be included within the coverage of each network device, which will not be limited in the embodiments of the present disclosure. In addition, the wireless communication system may further include other network entities such as a Mobile Management Entity (MME), a Serving Gateway (S-GW), and a Packet Data Network Gateway (P-GW), while the embodiments of the present disclosure are not limited thereto.

Specifically, a terminal device 20 and a terminal device 30 can communicate in a D2D communication mode. When performing a D2D communication, the terminal device 20 and the terminal device 30 communicate directly with each other via a D2D link, that is, a sidelink (SL). For example, as shown in FIG. 1 or FIG. 2, the terminal device 20 and the terminal device 30 communicate directly with each other via a sidelink. In FIG. 1, the terminal device 20 and the terminal device 30 communicate with each other via the sidelink, and the transmission resource thereof is allocated by a network device; in FIG. 2, the terminal device 20 and the terminal device 30 communicate with each other via the sidelink, the transmission resource thereof is independently selected by the terminal device, and the network device is not required to allocate the transmission resource.

The D2D communication may refer to Vehicle to Vehicle (V2V) communication or Vehicle to Everything (V2X) communication. In the V2X communication, X may refer to any device with wireless receiving and transmitting capabilities, such as, but not limited to, a slowly moving wireless device, a fast moving in-vehicle device, or a network control node with wireless transmitting and receiving capabilities. It should be understood that the embodiments of the present disclosure are mainly applied to the scenario of V2X communication, but may also be applied to any other D2D communication scenario, which will not be limited in the embodiments of the present disclosure.

In an Internet of Vehicles system, there may be two types of terminal devices, that is, a terminal device having a sensing capability such as a Vehicle User Equipment (VUE) or a Pedestrian User Equipment (PUE), and a terminal device that does not have a sensing capability such as a PUE. The VUE has higher processing capability and is usually powered by a battery in a vehicle, while the PUE has lower processing capability, and power consumption reduction is also a major factor that needs to be considered for the PUE. Therefore, in an existing Internet of Vehicles system, the VUE is considered to have full receiving and sensing capabilities; while the PUE is considered to have partial or no receiving and sensing capabilities. If the PUE has partial sensing capability, the resource may be selected using a similar sensing method as the VUE, and available resource may be selected on the part of the resources that can be sensed; if the PUE does not have the sensing capability, the PUE randomly selects the transmission resource in a resource pool.

In the version of Release-14 of the 3GPP protocol, two transmission modes are defined, namely transmission mode 3 (mode 3) and transmission mode 4 (mode 4). The transmission resource of a terminal device using the transmission mode 3 is allocated by a base station, and the terminal device transmits data on the sidelink according to the resource allocated by the base station; the base station can allocate resource for single transmission to the terminal device, or can also allocate resource for semi-static transmission to the terminal device. If the terminal device using the transmission mode 4 has a sensing capability, data is transmitted by means of sensing and reservation; if there is no sensing capability, the transmission resource is randomly selected in a resource pool. The terminal device having the sensing capability acquires an available resource set by means of sensing in the resource pool, and the terminal device randomly selects one resource from the set for data transmission. Since the services in the Internet of Vehicles system have the feature of periodicity, the terminal device usually adopts the semi-static transmission mode, that is, after selecting one transmission resource, the terminal device continuously uses the resource in multiple transmission cycles, thereby reducing the probability of resource reselection and resource conflicts. The terminal device will carry information on the reserved resource for the next transmission in control information of the current transmission, so that other terminal devices can determine whether the resource is reserved and used by the terminal device by detecting the control information of the terminal device, thereby achieving the purpose of reducing the resource conflicts.

Since the resource under the transmission mode 3 is scheduled by the base station and the resource pool under the transmission mode 4 is pre-configured or configured by the base station, there is no overlap of the resource pools for these two modes, that is, the resource pools corresponding to the transmission mode 3 and the transmission mode 4 are separated or do not overlap. The terminal device using the mode 3 transmits data on a time-frequency resource in a resource pool supporting the mode 3, and the terminal device using the mode 4 transmits data on a time-frequency resource in a resource pool supporting the mode 4.

For a terminal device supporting a communication protocol of the new version of Release-15 of the 3GPP protocol, two transmission modes such as the transmission mode 3 and the transmission mode 4 described above are also supported. When the terminal device with the version of Release-15 and the terminal device with the version of Release-14 transmit data together in a communication system, the terminal device having a sensing capability can select the resource through resource sensing, but it is difficult for the terminal device having no sensing capability to avoid interference with data transmission of other terminal devices. Since the terminal device using the transmission mode 3 is connected with the base station and its transmission resource is allocated by the base station, when the terminal device using the transmission mode 3 and the terminal device using the transmission mode 4 coexist, it is more necessary to protect the transmission reliability of the terminal device using the transmission mode 3.

Using the embodiments of the present disclosure, different resource pools are obtained for different types of terminal devices by dividing, and the relationships between the resource pools are coordinated reasonably, so that the different types of terminal devices transmit data together in the communication system and mutual interference is reduced. At least one of the following information of the different types of terminal devices is different: the supported version of the protocol, the transmission mode in use, and whether or not there is the sensing capability.

Figure 3:
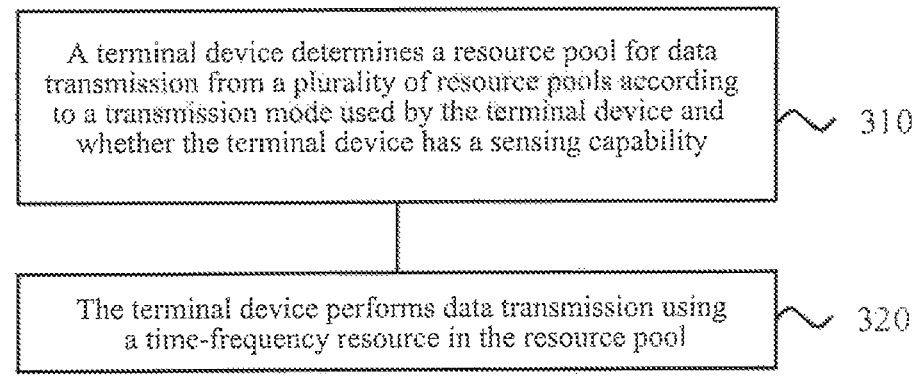
FIG. 3 is a schematic flowchart of a method for D2D communication according to an embodiment of the present disclosure.

FIG. 3 is a schematic flowchart of a method for D2D communication according to an embodiment of the present disclosure. The method shown in FIG. 3 may be performed by a terminal device, which may be, for example, the terminal device 20 or the terminal device 30 shown in FIG. 1. As shown in FIG. 3, the method for D2D communication includes:

in 310, a terminal device determines a resource pool for data transmission from a plurality of resource pools according to a transmission mode used by the terminal device and whether the terminal device has a sensing capability.

Different resource pools in the plurality of resource pools are used for data transmission by different types of terminal devices, and at least one of the following information of the different types of terminal devices is different: a transmission mode in use, a supported version of a communication protocol, and whether or not there is the sensing capability.

The terminal device may be, for example, a pedestrian user equipment PUE or a vehicle user equipment VUE.

In 320, the terminal device performs data transmission using a time-frequency resource in the resource pool.

Specifically, when terminal devices supporting different communication protocols transmit data together in a communication system, the terminal device having a sensing capability can select the resource through resource sensing, but it is difficult for the terminal device having no sensing capability to avoid interference with data transmission of other terminal devices. The terminal devices supporting different communication protocols determine respective resource pools for data transmission from a plurality of resource pools according to transmission modes used by the terminal devices and whether the terminal devices have a sensing capability. The plurality of resource pools may be configured by a network device, or agreed by the network device and the terminal device in advance, for example, as specified in the protocol. The different resource pools in the plurality of resource pools are used for data transmission by different types of terminal devices, and at least one of the following information of the different types of terminal devices is different: the transmission mode in use, the supported version of the communication protocol, and whether or not there is the sensing capability. Since not only the transmission mode used by the terminal device is considered, but also the version of the communication protocol supported by the terminal device as well as whether the terminal device has the sensing capability are considered when the resource pools are obtained by dividing, the interference of the data transmission among different types of terminal devices is reduced as much as possible.

The embodiments of the present disclosure provide two manners for obtaining resource pools by dividing, and details will be described below with reference to FIG. 4 and FIG. 5.

Manner 1

The terminal device having the sensing capability and the terminal device having no sensing capability do not share a resource pool.

(1) If the terminal device supports the communication protocol of the version of Release-14 (Rel-14) and does not support the communication protocol of the version of Release-15 (Rel-15), the terminal device determines the resource pool for data transmission by the terminal device, including:

if the terminal device uses the second transmission mode and does not have the sensing capability, determining that the resource pool is a first resource pool;

if the terminal device uses the second transmission mode and has the sensing capability, determining that the resource pool is a second resource pool, where the second resource pool does not overlap the first resource pool;

if the terminal device uses the first transmission mode, determining that the resource pool is a third resource pool, where the third resource pool does not overlap the first resource pool, and the third resource pool does not overlap the second resource pool.

In an embodiment, the first resource pool includes a first sub-resource pool and a second sub-resource pool, where the terminal device determines that the resource pool is the first resource pool, including: if the terminal device uses the second transmission mode and has the sensing capability, determining that the resource pool is the first sub-resource pool in the first resource pool.

(2) If the terminal device supports the communication protocol of the version of Release-15, the terminal device determines the resource pool for data transmission by the terminal device, including:

if the terminal device uses the second transmission mode and does not have the sensing capability, determining that the resource pool is the first resource pool;

if the terminal device supports the first transmission mode, or if the terminal device supports the second transmission mode and has the sensing capability, determining that the resource pool is a fourth resource pool, and the fourth resource pool does not overlap the first resource pool.

In an embodiment, the terminal device determines that the resource pool is the first resource pool, including: if the terminal device uses the second transmission mode and does not have the sensing capability, determining that the resource pool is the second sub-resource pool in the first resource pool.

In an embodiment, in the Manner 1, the fourth resource pool described above may include the second resource pool and/or the third resource pool.

Figure 4:
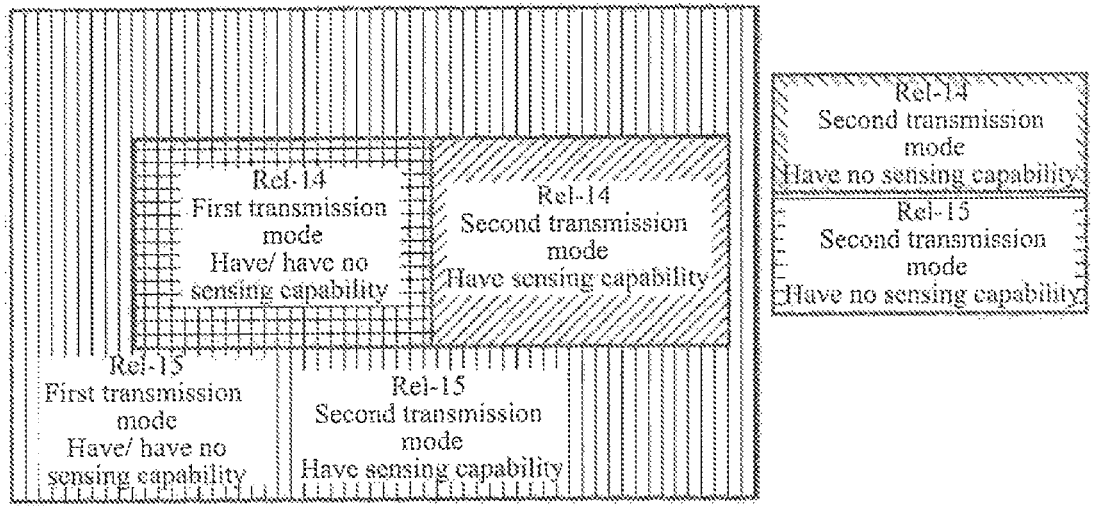
FIG. 4 is a schematic diagram of resource pool division according to an embodiment of the present disclosure.

For example, as the schematic diagram of resource pool division shown in FIG. 4, the plurality of resource pools in FIG. 4 include the first resource pool, the second resource pool, the third resource pool and the fourth resource pool. The first resource pool, the second resource pool and the third resource pool do not overlap each other, and the fourth resource pool does not overlap the first resource pool. Each of the resource pools is used for data transmission by a corresponding type of terminal devices. Table 1 shows the types of terminal devices corresponding to the different resource pools.

TABLE 1

| Resource Pool | | Type of the Terminal Device |
|---|---|---|
| The first resource pool | The first sub-resource pool | Support the version of Release-14, do not support the version of Release-15, use the second transmission mode, and do not have the sensing capability |
| | The second sub-resource pool | Support the version of Release-15, use the second transmission mode, and do not have the sensing capability |
| The second resource pool | | Support the version of Release-14, do not support the version of Release-15, use the second transmission mode, and have the sensing capability |
| The third resource pool | | Support the version of Release-14, do not support the version of Release-15, and use the first transmission mode |
| The fourth resource pool | | Support the version of Release-15, and use the first transmission mode<br>Support the version of Release-15, use the second transmission mode, and have the sensing capability |

The fourth resource pool may include the second resource pool and/or the third resource pool, that is, the range of the fourth resource pool may be greater than the range of the second resource pool and/or the third resource pool.

It should be understood that the fourth resource pool may include the second resource pool and/or the third resource pool, or the second resource pool may include the fourth resource pool, or the third resource pool may include the fourth resource pool. The size and location relationship between the second resource pool and the fourth resource pool and the size and location relationship between the third resource pool and the fourth resource pool are not limited in the embodiments of the present disclosure, as long as the first resource pool, the second resource pool and the third resource pool do not overlap each other, and the fourth resource pool and the first resource pool do not overlap each other.

It should also be understood that, in the embodiments of the present disclosure, the resource pool and the resource pool not overlapping may refer to, for example, the resource pool and the resource pool being orthonormal.

In addition, the first resource pool may be divided into the first sub-resource pool and the second sub-resource pool, or may not be divided, but is used for data transmission by the terminal devices that use the second transmission mode and do not have the sensing capability.

As shown in FIG. 4, the fourth resource pool includes the second resource pool and the third resource pool, where the first resource pool, the second resource pool, and the third resource pool do not overlap each other, and the fourth resource pool and the first resource pool do not overlap.

The fourth resource pool includes the third resource pool. Since the fourth resource pool and the third resource pool may both correspond to the terminal device supporting the first transmission mode and their transmission resources are all allocated by the base station, mutual interference among the terminal devices can be avoided through scheduling by the base station. The fourth resource pool may also correspond to the terminal device having the sensing capability, so that interference with the terminal device in the third resource pool can be avoided by sensing.

The fourth resource pool includes the second resource pool. If the terminal device in the fourth resource pool does not have the sensing capability, since the terminal device in the second resource pool has the sensing capability, interference with the terminal device in the fourth resource pool can be avoided by sensing. If the terminal device in the fourth resource pool has the sensing capability, the terminal devices in both of the fourth resource pool and the second resource pool have the sensing capability, which can avoid interference among the terminal devices.

And because the terminal device in the fourth resource pool may have the sensing capability, or may not have the sensing capability, it is possible for the terminal device having the sensing capability to avoid interference with other terminal devices in the fourth resource pool by sensing.

The fourth resource pool does not overlap the first sub-resource pool or the second sub-resource pool. Because the terminal devices in the first sub-resource pool and the second sub-resource pool do not have the sensing capability, interference with the terminal device in the fourth resource pool cannot be avoided, and resource pool sharing cannot be achieved. The interference from the terminal device having no sensing capability with the terminal device in the fourth resource pool can be avoided by dividing into non-overlapping resource pools.

Therefore, in one aspect, the resource pool of the terminal device that does not have the sensing capability and supports the second transmission mode is separated from the resource pool of the terminal device that has the sensing capability and supports the second transmission mode, thereby avoiding the interference from the terminal device that randomly selects the resource with the terminal device that selects the resource by sensing; in another aspect, the resource pool of the terminal device that does not have the sensing capability and supports the second transmission mode is separated from the resource pool of the terminal device that supports the first transmission mode, thereby avoiding the interference from the terminal device that randomly selects the resource with the terminal device of which the resource is allocated based on the base station; in yet another aspect, a larger resource pool range can be used by configuring a larger resource pool for both the terminal device that supports the version of Release-15 and uses the first transmission mode and the terminal device that supports the version of Release-15, has the sensing capability and supports the second transmission mode, thereby improving the resource utilization.

Manner 2

The terminal device having the sensing capability and the terminal device having no sensing capability may share a resource pool.

(1) If the terminal device supports the communication protocol of the version of Release-14 and does not support the communication protocol of the version of Release-15, the terminal device determines the resource pool for data transmission by the terminal device, including:

if the terminal device uses the second transmission mode, determining that the resource pool is a fifth resource pool;

if the terminal device uses the first transmission mode, determining that the resource pool is a sixth resource pool, and the sixth resource pool does not overlap the fifth resource pool.

In an embodiment, the fifth resource pool includes a third sub-resource pool and a fourth sub-resource pool, where the terminal device determines that the resource pool is the fifth resource pool, including: if the terminal device uses the second transmission mode, determining that the resource pool is the third sub-resource pool in the fifth resource pool.

(2) If the terminal device supports the communication protocol of the version of Release-15, the terminal device determines the resource pool for data transmission by the terminal device, including:

if the terminal device uses the second transmission mode and does not have the sensing capability, determining that the resource pool is the fifth resource pool;

if the terminal device uses the first transmission mode, determining that the resource pool is a seventh resource pool, and the seventh resource pool does not overlap the fifth resource pool;

if the terminal device uses the second transmission mode and has the sensing capability, determining that the resource pool is an eighth resource pool.

In an embodiment, the terminal device determines that the resource pool is the fifth resource pool, including: if the terminal device uses the second transmission mode and does not have the sensing capability, determining that the resource pool is the fourth sub-resource pool in the fifth resource pool.

In an embodiment, in the Manner 2, the seventh resource pool includes the sixth resource pool.

In an embodiment, in the Manner 2, the eighth resource pool includes at least one of the following resource pools: the fifth resource pool, the sixth resource pool and the seventh resource pool.

For example, as the schematic diagram of resource pool division shown in FIG. 5, the plurality of resource pools in FIG. 5 include the fifth resource pool, the sixth resource pool, the seventh resource pool and the eighth resource pool. The fifth resource pool does not overlap the sixth resource pool, and the fifth resource pool does not overlap the seventh resource pool. Each of the resource pools is used for data transmission by a corresponding type of terminal devices. Table 2 shows the types of terminal devices corresponding to the different resource pools.

TABLE 2

| Resource Pool | | Type of the Terminal Device |
|---|---|---|
| The fifth resource Pool | The third sub-resource pool | Support the version of Release-14, do not support the version of Release-15, and use the second transmission mode |
| | The fourth sub-resource pool | Support the version of Release-15, use the second transmission mode, and do not have the sensing capability |
| The sixth resource pool | | Support the version of Release-14, do not support the version of Release-15, and use the first transmission mode |
| The seventh resource pool | | Support the version of Release-15, and use the first transmission mode |
| The eighth resoure pool | | Support the version of Release-15, use the second transmission mode, and have the sensing capability |

The eighth resource pool includes at least one of the following resource pools: the fifth resource pool, the sixth resource pool and the seventh resource pool. The range of the eighth resource pool may be greater than the range of the fifth resource pool, the sixth resource pool and the seventh resource pool.

It should be understood that the eighth resource pool includes at least one of the fifth resource pool, the sixth resource pool and the seventh resource pool, or the fifth resource pool may include the eighth resource pool, or the sixth resource pool may include the eighth resource pool, or the seventh resource pool may include the eighth resource pool. The size and location relationship between the fifth resource pool and the eighth resource pool, the size and location relationship between the sixth resource pool and the eighth resource pool, and the size and location relationship between the seventh resource pool and the eighth resource pool are not limited in the embodiment of the present disclosure, as long as the fifth resource pool does not overlap the sixth resource pool, and the fifth resource pool does not overlap the seventh resource pool.

In addition, the fifth resource pool may be divided into the third sub-resource pool and the fourth sub-resource pool, or may not be divided, but is used for data transmission by the terminal device that supports the version of Release-14 and uses the second transmission mode, and by the terminal device that supports the version of Release-15, uses the second transmission mode and does not have the sensing capability.

As shown in FIG. 5, the fifth resource pool does not overlap the sixth resource pool, and the fifth resource pool does not overlap the seventh resource pool.

The seventh resource pool includes the sixth resource pool. Since for the terminal devices in both the sixth resource pool and the seventh resource pool, resources are allocated by the base station, the terminal devices in the sixth resource pool and the seventh resource pool do not interfere with each other.

The seventh resource pool does not overlap the third sub-resource pool and the fourth sub-resource pool. Since the third sub-resource pool and the fourth sub-resource pool have the terminal devices that do not have the sensing capability, such terminal devices randomly select resources, causing interference with the terminal device in the seventh resource pool.

The eighth resource pool includes the seventh resource pool. The terminal device in the eighth resource pool has the sensing capability, and interference with the terminal device in the seventh resource pool can be avoided by sensing.

The eighth resource pool includes the third sub-resource pool and the fourth sub-resource pool. Among the terminal devices that support Release-14, the terminal device having the sensing capability and the terminal device having no sensing capability can share a resource pool. Similarly, among the terminal devices that support Release-15, the terminal device having the sensing capability and the terminal device having no sensing capability may also share a resource pool.

Moreover, a larger resource pool range can be used by configuring a larger resource pool for both the terminal device that supports the version of Release-15 and uses the first transmission mode and the terminal device that supports the version of Release-15, has the sensing capability and supports the second transmission mode, thereby improving the resource utilization.

Based on the above description, using the embodiment of the present disclosure, different resource pools are obtained for different types of terminal devices by dividing, and the relationships between the resource pools are coordinated reasonably, so that different types of terminal devices transmit data together in the communication system and mutual interference is reduced, which in particular ensures the transmission reliability of the terminal devices that transmits data using the first transmission mode, and simultaneously enables the terminal device that supports the new version to have a larger resource pool range, improving the resource utilization. At least one of the following information of the different types of terminal devices is different: the supported version of the protocol, the transmission mode in use, and whether or not there is the sensing capability.

It should be understood that, in the embodiments of the present disclosure, the terminal device supporting Release-15 may include the terminal device supporting Release-15 or the terminal device of other versions that support Release-15, for example, the terminal device of Release-16 that supports Release-15.

In the embodiments of the present disclosure, the first transmission mode may be, for example, the foregoing transmission mode 3 in Release-14 of the 3GPP protocol, and when the terminal device uses the first transmission mode, the time-frequency resource for the data transmission by the terminal device is a resource scheduled by the network device; the second transmission mode may be, for example, the foregoing transmission mode 4 in Release-14 of the 3GPP protocol, and when the terminal device uses the second transmission mode, the time-frequency resource is a resource that can be selected independently by the terminal device, such as the resource selected randomly in a corresponding resource pool, or the resource determined by the terminal device based on a result of resource sensing.

FIG. 6 is a schematic flowchart of a method for D2D communication according to an embodiment of the present disclosure. The method shown in FIG. 6 may be performed by a network device, and the network device may be the network device 10 shown in FIG. 1. As shown in FIG. 6, the method for D2D communication includes:

In 610, the network device determines a plurality of resource pools, where different resource pools in the plurality of resource pools are used for data transmission by different types of terminal devices, and at least one of the following information of the different types of terminal devices is different: a transmission mode in use, a supported version of a communication protocol, and whether or not there is a sensing capability.

In 620, the network device transmits indication information to the terminal device, where the indication information is used for indicating the plurality of resource pools.

Therefore, the network device obtains different resource pools for different types of terminal devices by dividing and reasonably coordinates the relationships between the resource pools, so that different types of terminal devices transmit data together in the communication system and mutual interference is reduced, and in particular, it ensures the transmission reliability of the terminal devices that use the first transmission mode to transmit data, and simultaneously enables the terminal devices that support the new version to have a larger resource pool range, improving the resource utilization. At least one of the following information of the different types of terminal devices is different: the supported version of a protocol the transmission mode in use, and whether or not there is the sensing capability.

In an embodiment, the plurality of resource pools include a first resource pool, a second resource pool, a third resource pool, and a fourth resource pool, where the first resource pool, the second resource pool and the third resource pool do not overlap each other, and the fourth resource pool does not overlap the first resource pool, where the first resource pool is used for data transmission by a terminal device of the following type: a terminal device that uses the second transmission mode and does not have the sensing capability;

the second resource pool is used for data transmission by a terminal device of the following type: a terminal device that supports a version of Release-14 and does not support a version of Release-15, uses the second transmission mode and has the sensing capability;

the third resource pool is used for data transmission by a terminal device of the following type: a terminal device that supports the version of Release-14, does not support the version of Release-15 and uses the first transmission mode; and the fourth resource pool is used for data transmission by a terminal device of the following type: a terminal device that supports the version of Release-15 and uses the first transmission mode, or a terminal device that supports the version of Release-15, uses the second transmission mode and has the sensing capability.

In an embodiment, the fourth resource pool includes the second resource pool and/or the third resource pool.

In an embodiment, the first resource pool includes a first sub-resource pool and a second sub-resource pool, where the first sub-resource pool is specifically used for data transmission by a terminal device that supports the version of Release-14, does not support the version of Release-15, uses the second transmission mode and does not have the sensing capability. The second sub-resource pool is specifically used for data transmission by a terminal device that supports the version of Release-15, uses the second transmission mode and does not have the sensing capability.

In an embodiment, the plurality of resource pools include a fifth resource pool, a sixth resource pool, a seventh resource pool and an eighth resource pool, where the fifth resource pool does not overlap the sixth resource pool, and the fifth resource pool does not overlap the seventh resource pool.

The fifth resource pool is used for data transmission by a terminal devices of the following types: a terminal device that supports the version of Release-14, does not support the version of Release-15 and uses the second transmission mode, and a terminal device that supports the version of Release-15, uses the second transmission mode and does not have the sensing capability;

the sixth resource pool is used for data transmission by a terminal device of the following type: a terminal device that supports the version of Release-14, does not support the version of Release-15 and uses the first transmission mode;

the seventh resource pool is used for data transmission by a terminal device of the following type: a terminal device that supports the version of Release-15 and uses the first transmission mode;

the eighth resource pool is used for data transmission by a terminal device of the following type: a terminal device that supports the version of Release-15, uses the second transmission mode and has the sensing capability.

In an embodiment, the seventh resource pool includes the sixth resource pool.

In an embodiment, the eighth resource pool includes at least one of the following resource pools: the fifth resource pool, the sixth resource pool and the seventh resource pool.

In an embodiment, the fifth resource pool includes a third sub-resource pool and a fourth sub-resource pool, where the third sub-resource pool is specifically used for data transmission by a terminal device that supports the version of Release-14, does not support the version of Release-15 and uses the second transmission mode, and the fourth sub-resource pool is specifically used for data transmission by a terminal device that supports the version of Release-15, uses the second transmission mode and does not have the sensing capability.

In an embodiment, when the terminal device uses the first transmission mode, a time-frequency resource for performing the data transmission by the terminal device is a resource scheduled by the network device; when the terminal device uses the second transmission mode, the time-frequency resource is a resource independently selected by the terminal device in a corresponding resource pool.

It should be understood that for the plurality of resource pools that are obtained by the network device through dividing, reference may be made to related descriptions of the process of selecting a resource pool by the terminal device in the foregoing FIG. 3 to FIG. 5 and Table 1 and Table 2, which will not be repeated here for brevity.

It should also be understood that in various embodiments of the present disclosure, the sequence numbers of the above processes does not mean the order of execution, and the order of execution of each of the processes should be determined by its function and internal logic and should not constitute any limitation on the implementation processes of the embodiments of the present disclosure.

The method for D2D communication according to the embodiments of the present disclosure is described in detail above. Hereinafter, the apparatus according to embodiments of the present disclosure will be described with reference to FIG. 7 to FIG. 11. The technical features described in the method embodiments are applicable to the following apparatus embodiments.

Figure 7:
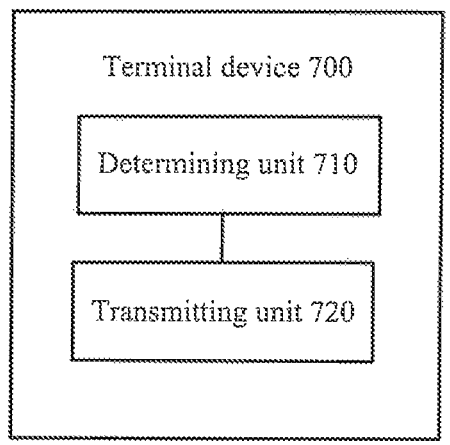
FIG. 7 is a schematic block diagram of a terminal device according to an embodiment of the present disclosure.

FIG. 7 is a schematic block diagram of a terminal device 700 according to an embodiment of the present disclosure.

As shown in FIG. 7, the terminal device 700 includes a determining unit 710 and a transmitting unit 720, where:

the determining unit 710 is used for determining a resource pool for data transmission from a plurality of resource pools according to a transmission mode used by the terminal device and whether the terminal device has a sensing capability, where the different resource pools in the plurality of resource pools are used for data transmission by different types of terminal devices, and at least one of the following information of the different types of terminal devices is different: a transmission mode in use, a supported version of a communication protocol, and whether or not there is the sensing capability;

the transmitting unit 720 is used for performing data transmission using a time-frequency resource in the resource pool.

Therefore, using the embodiment of the present disclosure, different resource pools are obtained for different types of terminal devices by dividing, and the relationships between the resource pools are coordinated reasonably, so that different types of terminal devices transmit data together in the communication system and mutual interference is reduces, which in particular ensures the transmission reliability of the terminal device that transmits data using a first transmission mode, and simultaneously enables the terminal device that supports a new version to have a larger resource pool range, improving the resource utilization. At least one of the following information of the different types of terminal devices is different: the supported version of the protocol, the transmission mode in use, and whether or not there is the sensing capability.

In an embodiment, if the terminal device supports the communication protocol of the version of Release-14 and does not support the communication protocol of the version of Release-15, the determining unit 710 is specifically used for: if the terminal device uses a second transmission mode and does not have the sensing capability, determining that the resource pool is a first resource pool; if the terminal device uses the second transmission mode and has the sensing capability, determining that the resource pool is a second resource pool, where the second resource pool does not overlap the first resource pool; if the terminal device uses a first transmission mode, determining that the resource pool is a third resource pool, where the third resource pool does not overlap the first resource pool, and the third resource pool does not overlap the second resource pool.

In an embodiment, the first resource pool includes a first sub-resource pool and a second sub-resource pool, where the determining unit 710 is specifically used for: if the terminal device uses the second transmission mode and does not have the sensing capability, determining that the resource pool is the first sub-resource pool in the first resource pool.

In an embodiment, if the terminal device supports the communication protocol of the version of Release-15, the determining unit 710 is specifically used for: if the terminal device uses the second transmission mode and does have the sensing capability, determining that the resource pool is the first resource pool; if the terminal device uses the first transmission mode, or if the terminal device uses the second transmission mode and has the sensing capability, determining that the resource pool is a fourth resource pool, and the fourth resource pool does not overlap the first resource pool.

In an embodiment, the determining unit 710 is specifically used for: if the terminal device uses the second transmission mode and does not have the sensing capability, determining that the resource pool is the second sub-resource pool in the first resource pool.

In an embodiment, the fourth resource pool includes the second resource pool and/or the third resource pool.

In an embodiment, if the terminal device supports the communication protocol of the version of Release-14 and does not support the communication protocol of the version of Release-15, the determining unit 710 is specifically used for: if the terminal device uses the second transmission mode, determining that the resource pool is a fifth resource pool; if the terminal device uses the first transmission mode, determining that the resource pool is a sixth resource pool, and the sixth resource pool does not overlap the fifth resource pool.

In an embodiment, the fifth resource pool includes a third sub-resource pool and a fourth sub-resource pool, where the determining unit 710 is specifically used for: if the terminal device uses the second transmission mode, determining that the resource pool is the third sub-resource pool in the fifth resource pool.

In an embodiment, if the terminal device supports the communication protocol of the version of Release-15, the determining unit 710 is specifically used for: if the terminal device uses the second transmission mode and does not have the sensing capability, determining that the resource pool is the fifth resource pool; if the terminal device uses the first transmission mode, determining that the resource pool is a seventh resource pool, where the seventh resource pool does not overlap the fifth resource pool; if the terminal device uses the second transmission mode and has the sensing capability, determining that the resource pool is an eighth resource pool.

In an embodiment, the determining unit 710 is specifically used for: if the terminal device uses a second transmission mode and does not have the sensing capability, determining that the resource pool is the fourth sub-resource pool in the fifth resource pool.

In an embodiment, the seventh resource pool includes the sixth resource pool.

In an embodiment, the eighth resource pool includes at least one of the following resource pools: the fifth resource pool, the sixth resource pool and the seventh resource pool.

In an embodiment, when the terminal device uses the first transmission mode, the time-frequency resource for performing the data transmission by the terminal device is a resource scheduled by a network device; when the terminal device uses the second transmission mode, the time-frequency resource is a resource independently selected by the terminal device in a corresponding resource pool.

Figure 8:
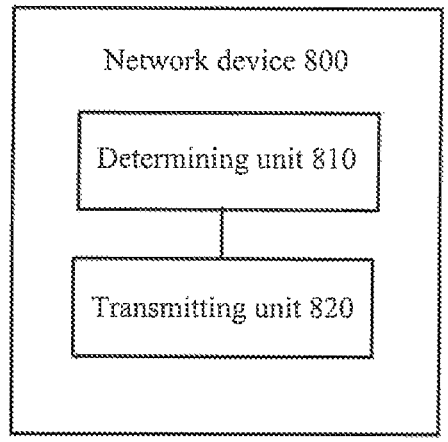
FIG. 8 is a schematic block diagram of a network device according to an embodiment of the present disclosure.

FIG. 8 is a schematic block diagram of a network device 800 according to an embodiment of the present disclosure. As shown in FIG. 8, the network device 800 includes a determining unit 810 and a transmitting unit 820, where:

the determining unit 810 is used for determining a plurality of resource pools, different resource pools in the plurality of resource pools are used for data transmission by different types of terminal devices, and at least one of the following information of the different types of terminal devices is different: a transmission mode in use, a supported version of a communication protocol, and whether or not there is a sensing capability;

the transmitting unit 820 is used for transmitting indication information to the terminal device, and the indication information is used for indicating the plurality of resource pools.

Therefore, the network device obtains different resource pools for different types of terminal devices by dividing and reasonably coordinates the relationships between the resource pools, so that different types of terminal devices transmit data together in the communication system and mutual interference is reduced, which in particular ensures the transmission reliability of the terminal device that transmits data using a first transmission mode, and simultaneously enables the terminal device that supports a new version to have a larger resource pool range, improving the resource utilization. At least one of the following information of the different types of terminal devices is different: the supported version of the protocol, the transmission mode in use, and whether or not there is the sensing capability.

In an embodiment, the plurality of resource pools include a first resource pool, a second resource pool, a third resource pool and a fourth resource pool, where the first resource pool, the second resource pool and the third resource do not overlap each other, and the fourth resource pool does not overlap the first resource pool. Where the first resource pool is used for data transmission by a terminal device of the following type: a terminal device that uses a second transmission mode and does not have the sensing capability; the second resource pool is used for data transmission by a terminal device of the following type: a terminal device that supports a version of Release-14 and does not support a version of Release-15, uses the second transmission mode and has the sensing capability; the third resource pool is used for data transmission by a terminal device of the following type: a terminal device that supports the version of Release-14, does not support the version of Release-15 and uses a first transmission mode; and the fourth resource pool is used for data transmission by terminal devices of the following types: a terminal device that supports the version of Release-15 and uses the first transmission mode, or a terminal device that supports the version of Release-15, uses the second transmission mode and has the sensing capability.

In an embodiment, the fourth resource pool includes the second resource pool and/or the third resource pool.

In an embodiment, the first resource pool includes a first sub-resource pool and a second sub-resource pool, where the first sub-resource pool is specifically used for data transmission by a terminal device that supports the version of Release-14, does not support the version of Release-15, uses the second transmission mode and does not have the sensing capability, and the second sub-resource pool is specifically used for data transmission by a terminal device that supports the version of Release-15, uses the second transmission mode and does not have the sensing capability.

In an embodiment, the plurality of resource pools include a fifth resource pool, a sixth resource pool, a seventh resource pool and an eighth resource pool, where the fifth resource pool does not overlap the sixth resource pool, and the fifth resource pool does not overlap the seventh resource pool. The fifth resource pool is used for data transmission by terminal devices of the following types: a terminal device that supports the version of Release-14, does not support the version of Release-15 and uses the second transmission mode, and a terminal device that supports the version of Release-15, uses the second transmission mode and does not have the sensing capability; the sixth resource pool is used for data transmission by a terminal device of the following type: a terminal device that supports the version of Release-14, does not support the version of Release-15 and uses the first transmission mode; the seventh resource pool is used for data transmission by a terminal device of the following type: a terminal device that supports the version of Release-15 and uses the first transmission mode; the eighth resource pool is used for data transmission by a terminal device of the following type: a terminal device that supports the version of Release-15, uses the second transmission mode and has the sensing capability.

In an embodiment, the seventh resource pool includes the sixth resource pool.

In an embodiment, the eighth resource pool includes at least one of the following resource pools: the fifth resource pool, the sixth resource pool and the seventh resource pool.

In an embodiment, the fifth resource pool includes a third sub-resource pool and a fourth sub-resource pool, where the third sub-resource pool is specifically used for data transmission by a terminal device that supports the version of Release-14, does not support the version of Release-15 and uses the second transmission mode, and the fourth sub-resource pool is specifically used for data transmission by a terminal device that supports the version of Release-15, uses the second transmission mode and does not have the sensing capability.

In an embodiment, when the terminal device uses the first transmission mode, a time-frequency resource used for performing the data transmission by the terminal device is a resource scheduled by the network device; when the terminal device uses the second transmission mode, the time-frequency resource is a resource independently selected by the terminal device in a corresponding resource pool.

Figure 9:
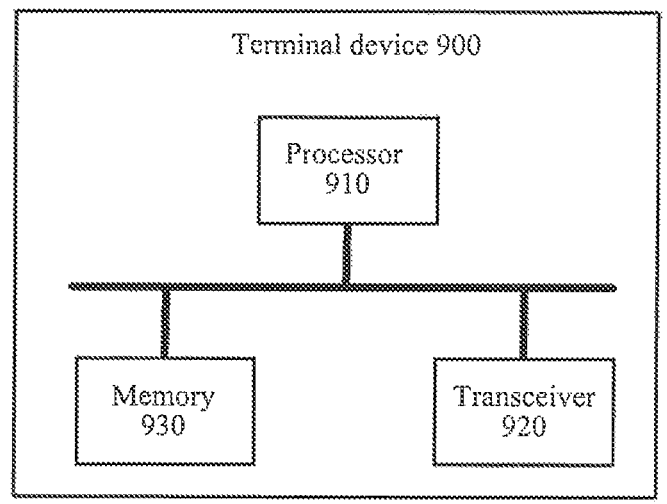
FIG. 9 is a schematic structural diagram of a terminal device according to an embodiment of the present disclosure.

FIG. 9 is a schematic structural diagram of a terminal device 900 according to an embodiment of the present disclosure. As shown in FIG. 9, the terminal device includes a processor 910, a transceiver 920 and a memory 930, where the processor 910, the transceiver 920, and the memory 930 communicate with each other through internal connection paths. The memory 930 is used for storing instructions, and the processor 910 is used for executing the instructions stored by the memory 930 to control the transceiver 920 to receive signals or transmit signals. Where the processor 910 is used for:

determining a resource pool for data transmission from a plurality of resource pools according to a transmission mode used by the terminal device and whether the terminal device has a sensing capability, where the different resource pools in the plurality of resource pools are used for data transmission by different types of terminal devices, and at least one of the following information of the different types of terminal devices is different: a transmission mode in use, a supported version of a communication protocol, and whether or not there is the sensing capability;

the transceiver 920 is used for performing data transmission using a time-frequency resource in the resource pool.

In an embodiment, if the terminal device supports the communication protocol of a version of Release-14, and does not support the communication protocol of a version of Release-15, the processor 910 is specifically used for: if the terminal device uses a second transmission mode and does not have the sensing capability, determining that the resource pool is a first resource pool; if the terminal device uses the second transmission mode and has the sensing capability, determining that the resource pool is a second resource pool, where the second resource pool does not overlap the first resource pool; if the terminal device uses a first transmission mode, determining that the resource pool is a third resource pool, where the third resource pool does not overlap the first resource pool, and the third resource pool does not overlap the second resource pool.

In an embodiment, the first resource pool includes a first sub-resource pool and a second sub-resource pool, where the processor 910 is specifically used for: if the terminal device uses the second transmission mode and does not have the sensing capability, determining that the resource pool is the first sub-resource pool in the first resource pool.

In an embodiment, if the terminal device supports the communication protocol of the version of Release-15, the processor 910 is specifically used for: if the terminal device uses the second transmission mode and does not have the sensing capability, determining that the resource pool is the first resource pool; if the terminal device supports the first transmission mode, or if the terminal device supports the second transmission mode and has the sensing capability, determining that the resource pool is a fourth resource pool, and the fourth resource pool does not overlap the first resource pool.

In an embodiment, the processor 910 is specifically used for: if the terminal device uses the second transmission mode and does not have the sensing capability, determining that the resource pool is the second sub-resource pool in the first resource pool.

In an embodiment, the fourth resource pool includes the second resource pool and/or the third resource pool.

In an embodiment, if the terminal device supports the communication protocol of the version of Release-14 and does not support the communication protocol of the version of Release-15, the processor 910 is specifically used for: if the terminal device uses the second transmission mode, determining that the resource pool is a fifth resource pool; if the terminal device uses the first transmission mode, determining that the resource pool is a sixth resource pool, and the sixth resource pool does not overlap the fifth resource pool.

In an embodiment, the fifth resource pool includes a third sub-resource pool and a fourth sub-resource pool, where the processor 910 is specifically used for: if the terminal device uses the second transmission mode, determining that the resource pool is the third sub-resource pool in the fifth resource pool.

In an embodiment, if the terminal device supports the communication protocol of the version of Release-15, the processor 910 is specifically used for: if the terminal device uses the second transmission mode and does not have the sensing capability, determining that the resource pool is the fifth resource pool; if the terminal device uses the first transmission mode, determining that the resource pool is a seventh resource pool, and the seventh resource pool does not overlap the fifth resource pool; if the terminal device uses the second transmission mode and has the sensing capability, determining that the resource pool is an eighth resource pool.

In an embodiment, the processor 910 is specifically used for: if the terminal device uses the second transmission mode and does not have the sensing capability, determining that the resource pool is the fourth sub-resource pool in the fifth resource pool.

In an embodiment, the seventh resource pool includes the sixth resource pool.

In an embodiment, the eighth resource pool includes at least one of the following resource pools: the fifth resource pool, the sixth resource pool and the seventh resource pool.

In an embodiment, when the terminal device uses the first transmission mode, the time-frequency resource for performing the data transmission by the terminal device is a resource scheduled by a network device; when the terminal device uses the second transmission mode, the time-frequency resource is a resource independently selected by the terminal device in a corresponding resource pool, and/or a resource determined by the terminal device based on a result of resource sensing.

It should be understood that in the embodiment of the present disclosure, the processor 910 may be a Central Processing Unit (CPU), and the processor 910 may also be other general-purpose processor, a Digital Signal Processor (DSP), an Application Specific Integrated Circuit (ASIC), a Field Programmable Gate Array (FPGA) or other programmable logic device, a discrete gate or a transistor logic device, a discrete hardware component, etc. The general-purpose processor may be a microprocessor, or may be any conventional processor, etc.

The memory 930 may include a read only memory and a random access memory, and provides instructions and data to the processor 910. A part of the memory 930 may also include a non-volatile random access memory.

In the implementation process, the steps of the foregoing method may be completed by an integrated logic circuit of hardware in the processor 910 or instructions in a form of software. The steps of the method for D2D communication disclosed in the embodiments of the present disclosure may be directly completed by a hardware processor, or may be performed by a combination of hardware in the processor 910 and software modules. The software modules may be located in a conventional storage medium in the art such as a random access memory, a flash memory, a read only memory, a programmable read only memory or an electrically erasable programmable memory, a register. The storage medium is located in the memory 930, and the processor 910 reads the information in the memory 930 and completes the steps of the foregoing method in combination with its hardware. To avoid repetition, it will not be described in detail here.

The terminal device 900 according to the embodiment of the present disclosure may correspond to the terminal device, in the method 300 of FIG. 3, for performing the method 300 in FIG. 3, and to the terminal device 700 according to the embodiment of the present disclosure. The units or modules in the terminal device 900 are respectively used for performing the actions or the processing procedures performed by the terminal device in the method 300 of FIG. 3. Here, in order to avoid redundancy, detailed description thereof is omitted.

Figure 10:
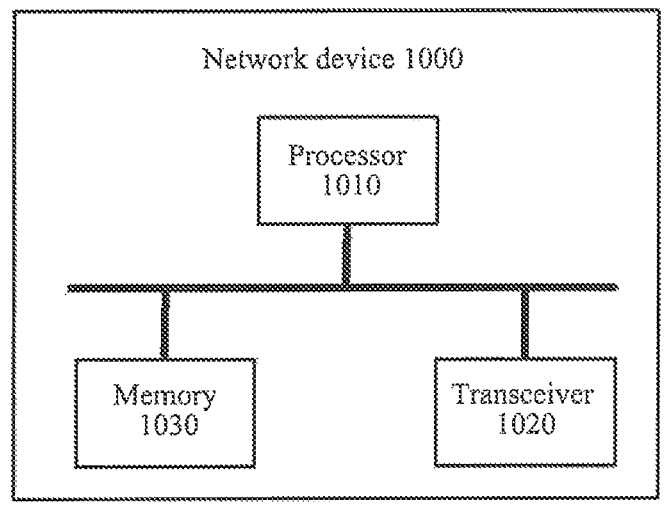
FIG. 10 is a schematic structural diagram of a network device according to an embodiment of the present disclosure.

FIG. 10 is a schematic structural diagram of a network device 1000 according to an embodiment of the present disclosure. As shown in FIG. 10, the network device includes a processor 1010, a transceiver 1020 and a memory 1030, where the processor 1010, the transceiver 1020 and the memory 1030 communicate with each other through internal connection paths. The memory 1030 is used for storing instructions, and the processor 1010 is used for executing the instructions stored by the memory 1030 to control the transceiver 1020 to receive signals or transmit signals. Where the processor 1010 is used for:

determining a plurality of resource pools, where different resource pools of the plurality of resource pools are used for data transmission by different types of terminal devices, and at least one of the following information of the different types of terminal devices is different: a transmission mode in use, a supported version of a communication protocol, and whether or not there is a sensing capability;

the transceiver 1020 is used for transmitting indication information to the terminal device, where the indication information is used for indicating the plurality of resource pools.

In an embodiment, the plurality of resource pools include a first resource pool, a second resource pool, a third resource pool and a fourth resource pool, where the first resource pool, the second resource pool and the third resource do not overlap each other, and the fourth resource pool does not overlap the first resource pool. Where the first resource pool is used for data transmission by a terminal device of the following type: a terminal device that uses a second transmission mode and does not have the sensing capability; the second resource pool is used for data transmission by a terminal device of the following type: a terminal device that supports a version of Release-14 and does not support a version of Release-15, uses the second transmission mode and has the sensing capability; the third resource pool is used for data transmission by a terminal device of the following type: a terminal device that supports the version of Release-14, does not support the version of Release-15 and uses the first transmission mode; and the fourth resource pool is used for data transmission by terminal devices of the following types: a terminal device that supports the version of Release-15 and uses the first transmission mode, or a terminal device that supports the version of Release-15, uses the second transmission mode and has the sensing capability.

In an embodiment, the fourth resource pool includes the second resource pool and/or the third resource pool.

In an embodiment, the first resource pool includes a first sub-resource pool and a second sub-resource pool, where the first sub-resource pool is specifically used for data transmission by a terminal device that supports the version of Release-14, does not support the version of Release-15, uses the second transmission mode and does not have the sensing capability, and the second sub-resource pool is specifically used for data transmission by a terminal device that supports the version of Release-15, uses the second transmission mode and does not have the sensing capability.

In an embodiment, the plurality of resource pools include a fifth resource pool, a sixth resource pool, a seventh resource pool and an eighth resource pool, where the fifth resource pool does not overlap the sixth resource pool, and the fifth resource pool does not overlap the seventh resource pool. The fifth resource pool is used for data transmission by terminal devices of the following types: a terminal device that supports the version of Release-14, does not support the version of Release-15 and uses the second transmission mode, and a terminal device that supports the version of Release-15, uses the second transmission mode and does not have the sensing capability; the sixth resource pool is used for data transmission by a terminal device of the following type: a terminal device that supports the version of Release-14, does not support the version of Release-15 and uses the first transmission mode; the seventh resource pool is used for data transmission by a terminal device of the following type: a terminal device that supports the version of Release-15 and uses the first transmission mode; the eighth resource pool is used for data transmission by a terminal device of the following type: a terminal device that supports the version of Release-15, uses the second transmission mode and has the sensing capability.

In an embodiment, the seventh resource pool includes the sixth resource pool.

In an embodiment, the eighth resource pool includes at least one of the following resource pools: the fifth resource pool, the sixth resource pool and the seventh resource pool.

In an embodiment, the fifth resource pool includes a third sub-resource pool and a fourth sub-resource pool, where the third sub-resource pool is specifically used for data transmission by a terminal device that supports the version of Release-14, does not support the version of Release-15 and uses the second transmission mode, and the fourth sub-resource pool is specifically used for data transmission by a terminal device that supports the version of Release-15, uses the second transmission mode and does not have the sensing capability.

In an embodiment, when the terminal device uses the first transmission mode, a time-frequency resource used for performing the data transmission by the terminal device is a resource scheduled by the network device; when the terminal device uses the second transmission mode, the time-frequency resource is a resource independently selected by the terminal device in a corresponding resource pool.

It should be understood that, in the embodiment of the present disclosure, the processor 1010 may be a Central Processing Unit (CPU), and the processor 1010 may also be other general-purpose processor, a Digital Signal Processor (DSP), an Application Specific Integrated Circuit (ASIC), a Field Programmable Gate Array (FPGA) or other programmable logic device, a discrete gate or a transistor logic device, a discrete hardware component, etc. The general-purpose processor may be a microprocessor, or may be any conventional processor, etc.

The memory 1030 may include a read only memory and a random access memory, and provides instructions and data to the processor 1010. A part of the memory 930 may also include a non-volatile random access memory. In the implementation process, the steps of the foregoing method may be completed by an integrated logic circuit of hardware in the processor 1010 or instructions in a form of software. The steps of the method for D2D communication disclosed in the embodiment of the present disclosure may be directly completed by a hardware processor, or may be performed by a combination of hardware in the processor 1010 and software modules. The software modules may be located in a conventional storage medium in the art such as a random access memory, a flash memory, a read only memory, a programmable read only memory or an electrically erasable programmable memory, a register. The storage medium is located in the memory 1030, and the processor 1010 reads the information in the memory 1030 and completes the steps of the foregoing method in combination with its hardware. To avoid repetition, it will not be described in detail here.

The network device 1000 according to the embodiment of the present disclosure may correspond to the network device, in the method 600 of FIG. 6, for performing the method 600 in FIG. 6 and to the network device 800 according to the embodiment of the present disclosure. The units or modules in the network device 1000 are respectively used for performing the actions or the processing procedures performed by the terminal device in the method 600 of FIG. 6. Here, in order to avoid redundancy, detailed description thereof is omitted.

Figure 11:
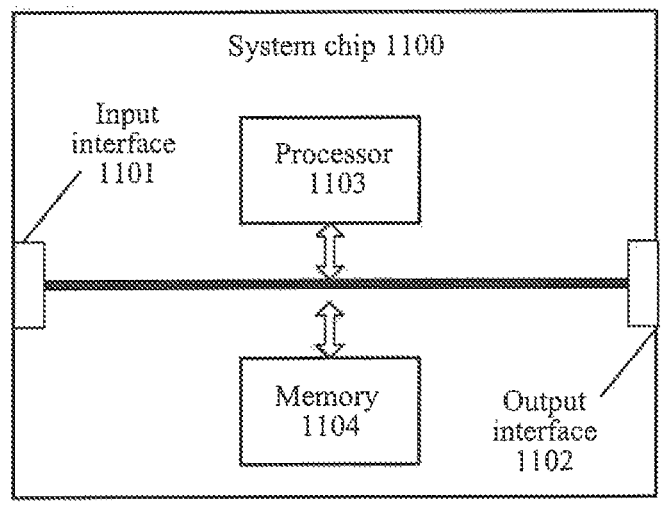
FIG. 11 is a schematic structural diagram of a system chip according to an embodiment of the present disclosure.

FIG. 11 is a schematic structural diagram of a system chip according to an embodiment of the present disclosure. The system chip 1100 of FIG. 11 includes an input interface 1101, an output interface 1102, at least one processor 1103 and a memory 1104. The input interface 1101, the output interface 1102, the processor 1103 and the memory 1104 connect with each other through internal connection paths. The processor 1103 is used for performing the code in the memory 1104.

In an embodiment, when the code is executed, the processor 1103 can implement the method 300 in FIG. 3 performed by the terminal device in the method embodiments. For the sake of brevity, it will not be repeated here.

In an embodiment, when the code is executed, the processor 1103 can implement the method 600 in FIG. 6 performed by the network device in the method embodiments. For the sake of brevity, it will not be repeated here.

Those of ordinary skill in the art will appreciate that units and algorithm steps of each example described with reference to the embodiments disclosed herein can be implemented in electronic hardware or a combination of computer software and electronic hardware. Whether these functions are performed in hardware or software depends on the specific application and design constraints of the technical solutions. A person skilled in the art can implement the described functions in different ways for each specific application, but such an implementation should not be considered to be beyond the scope of the present disclosure.

A person skilled in the art can clearly understand that for convenience and brevity of the description, the specific working process of the system, the device and the unit described above may refer to corresponding processes in the above method embodiments, and will not be repeated herein.

In the several embodiments provided by the present disclosure, it should be understood that the disclosed systems, devices, and methods may be implemented in other ways. For example, the device embodiments described above are merely illustrative. For example, the division of the units is only a division of logical functions, and there may be another division way in actual implementation, for example, multiple units or components may be combined or be integrated into another system, or some features may be ignored or not performed. In addition, the mutual coupling or direct coupling or communication connection shown or discussed herein may be an indirect coupling or communication connection through some interfaces, devices or units, and may be in an electrical, mechanical or other form.

The units described as discrete components may be or may not be physically separated, and the components illustrated as units may be or may not be physical units, that is, they may be located in one place, or may be distributed to multiple network units. Some or all of the units may be selected according to actual needs to achieve the objectives of the solutions of the embodiments.

In addition, each functional unit in each embodiment of the present disclosure may be integrated into one processing unit, or each unit may exist physically separately, or two or more units may be integrated into one unit.

The functions may be stored in a computer readable storage medium if implemented in the form of a software functional unit, and sold or used as a standalone product. Based on such understanding, the technical solutions of the present disclosure, which are essential or the parts contribute to the prior art, or a part of the technical solution, may be embodied in a form of a software product, and the computer software product is stored in a storage medium and includes instructions for enabling a computer device (which may be a personal computer, a server, or a network device, etc.) to perform all or part of the steps described in methods in each embodiment of the present disclosure. The above storage medium includes various media that can store program codes, such as a U disk, a mobile hard disk, a read-only memory (ROM), a random access memory (RAM), a magnetic disk, or an optical disk.

The above is only specific implementations of the present disclosure, the scope of protection the embodiments of the present disclosure is not limited thereto. Any variation or replacement that may be readily contemplated by those skilled in the art within the technical scope disclosed in the present disclosure should be covered by the scope of protection of the present disclosure for personal gain. Therefore, the scope of protection of the embodiments of the present disclosure should be determined by the scope of protection of the claims.

What is claimed is:

1. A method for device to device (D2D) communication, comprising:

determining, by a terminal device, a resource pool for data transmission from a plurality of resource pools, according to a transmission mode used by the terminal device, a version of a communication protocol supported by the terminal device, and whether the terminal device has a sensing capability, wherein different resource pools in the plurality of resource pools are used for data transmission by different types of terminal devices, respectively, and the different types comprises at least one of the following: different transmission modes in use, different supported versions of a communication protocol, and whether or not there is the sensing capability; and performing, by the terminal device, data transmission using a time-frequency resource in the resource pool;

wherein the transmission mode used by the terminal device comprises a first transmission mode or a second transmission mode, the first transmission mode is mode 3, the second transmission mode is mode 4, and a resource pool of a terminal device that does not have the sensing capability and supports the second transmission mode is different from a resource pool of a terminal device supports the first transmission mode;

wherein the plurality of resource pools comprise a first resource pool, a second resource pool, a third resource pool, a fourth resource pool, a fifth resource pool, a sixth resource pool, a seventh resource pool and an eighth resource pool, wherein the first resource pool, the second resource pool and the third resource pool do not overlap each other, and the fourth resource pool does not overlap the first resource pool, the fifth resource pool does not overlap the sixth resource pool, and the fifth resource pool does not overlap the seventh resource pool;

wherein the determining, by the terminal device, a resource pool for data transmission comprises:

determining, by the terminal device, that the resource pool is the first resource pool if the terminal device uses the second transmission mode and does not have the sensing capability;

determining, by the terminal device, that the resource pool is the second resource pool if the terminal device supports a version of Release-14, does not support a version of Release-15, uses the second transmission mode and has the sensing capability;

determining, by the terminal device, that the resource pool is the third resource pool if the terminal device supports the version of Release-14, does not support the version of Release-15 and uses the first transmission mode;

determining, by the terminal device, that the resource pool is the fourth resource pool if the terminal device supports the version of Release-15 and uses the first transmission mode, or if the terminal device supports the version of Release-15, uses the second transmission mode and has the sensing capability;

determining, by the terminal device, that the resource pool is the fifth resource pool if the terminal device supports the version of Release-14, does not support the version of Release-15 and uses the second transmission mode, or if the terminal device supports the version of Release-15, uses the second transmission mode and does not have the sensing capability;

determining, by the terminal device, that the resource pool is the sixth resource pool if the terminal device supports the version of Release-14, does not support the version of Release-15 and uses the first transmission mode;

determining, by the terminal device, that the resource pool is the seventh resource pool if the terminal device supports the version of Release-15 and uses the first transmission mode;

determining, by the terminal device, that the resource pool is the eighth resource pool if the terminal device supports the version of Release-15, uses the second transmission mode and has the sensing capability.

2. A terminal device, comprising: a processor, a transceiver and a memory, wherein the processor, the transceiver and the memory communicate with each other, the memory is configured to store instructions, and the processor is configured to execute the instructions stored by the memory;

the processor is configured to determine a resource pool for data transmission from a plurality of resource pools, according to a transmission mode used by the terminal device, a version of a communication protocol supported by the terminal device, and whether the terminal device has a sensing capability, wherein different resource pools in the plurality of resource pools are used for data transmission by different types of terminal devices, and the different types comprises at least one of the following: different transmission modes in use, different supported versions of a communication protocol, and whether or not there is the sensing capability;

the transceiver is configured to perform data transmission using a time-frequency resource in the resource pool;

wherein the transmission mode used by the terminal device comprises a first transmission mode or a second transmission mode, the first transmission mode is mode 3, the second transmission mode is mode 4, and a resource pool of a terminal device that does not have the sensing capability and supports the second transmission mode is different from a resource pool of a terminal device supports the first transmission mode;

wherein the plurality of resource pools comprise a first resource pool, a second resource pool, a third resource pool, a fourth resource pool, a fifth resource pool, a sixth resource pool, a seventh resource pool and an eighth resource pool, wherein the first resource pool, the second resource pool and the third resource pool do not overlap each other, and the fourth resource pool does not overlap the first resource pool, the fifth resource pool does not overlap the sixth resource pool, and the fifth resource pool does not overlap the seventh resource pool;

the processor is specifically configured to:

determine that the resource pool is the first resource pool if the terminal device uses the second transmission mode and does not have the sensing capability;

determine that the resource pool is the second resource pool if the terminal device supports a version of Release-14, does not support a version of Release-15, uses the second transmission mode and has the sensing capability;

determine that the resource pool is the third resource pool if the terminal device supports the version of Release-14, does not support the version of Release-15, and uses the first transmission mode;

determine that the resource pool is the fourth resource pool if the terminal device supports the version of Release-15 and uses the first transmission mode, or if the terminal device supports the version of Release-15, uses the second transmission mode and has the sensing capability;

determine that the resource pool is the fifth resource pool if the terminal device supports the version of Release-14, does not support the version of Release-15 and uses the second transmission mode, or if the terminal device supports the version of Release-15, uses the second transmission mode and does not have the sensing capability;

determine that the resource pool is the sixth resource pool if the terminal device supports the version of Release-14, does not support the version of Release-15 and uses the first transmission mode;

determine that the resource pool is the seventh resource pool if the terminal device supports the version of Release-15 and uses the first transmission mode;

determine the resource pool is the eighth resource pool if the terminal device supports the version of Release-15 and uses the second transmission mode and has the sensing capability.

3. The terminal device according to claim 2, wherein the first resource pool comprises a first sub-resource pool and a second sub-resource pool, the processor is configured to:

determine that the resource pool is the first sub-resource pool in the first resource pool if the terminal device uses the second transmission mode and does not have the sensing capability.

4. The terminal device according to claim 3, wherein the processor is configured to:

determine that the resource pool is the second sub-resource pool in the first resource pool if the terminal device uses the second transmission mode and does not have the sensing capability.

5. The terminal device according to claim 2, wherein the fourth resource pool comprises at least one of: the second resource pool and the third resource pool.

6. The terminal device according to claim 2, wherein the fifth resource pool comprises a third sub-resource pool and a fourth sub-resource pool, the processor is configured to:

determine that the resource pool is the third sub-resource pool in the fifth resource pool if the terminal device uses the second transmission mode.

7. The terminal device according to claim 6, wherein the processor is configured to:

determine that the resource pool is the fourth sub-resource pool in the fifth resource pool if the terminal device uses the second transmission mode and does not have the sensing capability.

8. The terminal device according to claim 2, wherein the seventh resource pool comprises the sixth resource pool.

9. The terminal device according to claim 2, wherein the eighth resource pool comprises at least one of the following resource pools: the fifth resource pool, the sixth resource pool and the seventh resource pool.

10. A network device, comprising: a processor, a transceiver and a memory, wherein the processor, the transceiver and the memory communicate with each other, the memory is configured to store instructions, and the processor is configured to execute the instructions stored by the memory;

the processor is configured to determine a plurality of resource pools, according to a transmission mode used by a terminal device, a version of a communication protocol supported by the terminal device, and whether the terminal device has a sensing capability, wherein different resource pools in the plurality of resource pools are used for data transmission by different types of terminal devices, respectively, and the different types comprises at least one of the following: different transmission modes in use, different supported versions of a communication protocol, and whether or not there is the sensing capability; and the transceiver is configured to transmit indication information to a terminal device, wherein the indication information is used for indicating the plurality of resource pools;

wherein the transmission mode used by the terminal device comprises a first transmission mode or a second transmission mode, the first transmission mode is mode 3, the second transmission mode is mode 4, and a resource pool of a terminal device that does not have the sensing capability and supports the second transmission mode is different from a resource pool of a terminal device that supports the first transmission mode;

wherein the plurality of resource pools comprise a first resource pool, a second resource pool, a third resource pool, a fourth resource pool, a fifth resource pool, a sixth resource pool, a seventh resource pool and an eighth resource pool, wherein the first resource pool, the second resource pool and the third resource pool do not overlap each other, and the fourth resource pool does not overlap the first resource pool, the fifth resource pool does not overlap the sixth resource pool, and the fifth resource pool does not overlap the seventh resource pool;

wherein the first resource pool is used for data transmission by a terminal device of the following type: a terminal device that uses the second transmission mode and does not have the sensing capability;

the second resource pool is used for data transmission by a terminal device of the following type: a terminal device that supports a version of Release-14, does not support a version of Release-15, uses the second transmission mode and has the sensing capability;

the third resource pool is used for data transmission by a terminal device of the following type: a terminal device that supports the version of Release-14, does not support the version of Release-15 and uses a first transmission mode; and the fourth resource pool is used for data transmission by a terminal device of the following type: a terminal device that supports the version of Release-15 and uses the first transmission mode, or a terminal device that supports the version of Release-15, uses the second transmission mode and has the sensing capability;

the fifth resource pool is used for data transmission by terminal devices of the following types: a terminal device that supports a version of Release-14, does not support a version of Release-15 and uses a second transmission mode, and a terminal device that supports the version of Release-15, uses the second transmission mode and does not have the sensing capability;

the sixth resource pool is used for data transmission by a terminal device of the following type: a terminal device that supports the version of Release-14, does not support the version of Release-15 and uses a first transmission mode;

the seventh resource pool is used for data transmission by a terminal device of the following type: a terminal device that supports the version of Release-15 and uses the first transmission mode; and the eighth resource pool is used for data transmission by a terminal device of the following type: a terminal device that supports the version of Release-15, uses the second transmission mode and has the sensing capability.

* * * * *